US012650887B2

(12) United States Patent
Schoch et al.

(10) Patent No.: US 12,650,887 B2
(45) Date of Patent: Jun. 9, 2026

(54) SYSTEM INTEGRATION IN AUTOMATION ENGINEERING

(71) Applicant: ABB Schweiz AG, Baden (CH)

(72) Inventors: Nicolai Schoch, Heidelberg (DE);
Mario Hoernicke, Landau (DE);
Katharina Stark, Weinheim (DE)

(73) Assignee: ABB Schweiz AG, Baden (CH)

( * ) Notice: Subject to any disclaimer, the term of this patent is extended or adjusted under 35 U.S.C. 154(b) by 397 days.

(21) Appl. No.: 18/347,725

(22) Filed: Jul. 6, 2023

(65) Prior Publication Data

US 2024/0012695 A1      Jan. 11, 2024

(30) Foreign Application Priority Data

Jul. 6, 2022      (EP) ..................................... 22183402

(51) Int. Cl.
*G06F 9/54* (2006.01)
(52) U.S. Cl.
CPC ................................... *G06F 9/541* (2013.01)
(58) Field of Classification Search
CPC ... G06F 9/541; G06F 8/10; G06F 8/24; G05B 19/41845; G05B 2219/31094
See application file for complete search history.

(56) References Cited

U.S. PATENT DOCUMENTS

2007/0162465 A1 * 7/2007 Cope ..................... G06F 40/157
2021/0048798 A1 * 2/2021 Bulanda ................ H04J 3/0661

OTHER PUBLICATIONS

Sebastian C. Brandt, An ontology-based approach to knowledge management in design processes, 2007, ScienceDirect (Year: 2007).*
Brandt et al., "An Ontology-Based Approach to Knowledge Management in Design Processes," *Computers & Chemical Engineering*, 32(1-2): 320-342 (Jan. 2008).
European Patent Office, Extended European Search Report in European Patent Application No. 22183402.1, 7 pp. (Dec. 12, 2022).

* cited by examiner

*Primary Examiner* — Dong U Kim
(74) *Attorney, Agent, or Firm* — Fitch Even Tabin & Flannery LLP

(57)      ABSTRACT

A method performed by an integration subsystem for integrating a plurality of automation engineering subsystems into an aggregate system, the method comprising using at least one ontological model to interface a first said automation engineering subsystem with a second said automation engineering subsystem. Interoperability of the subsystems is therefore facilitated.

13 Claims, 4 Drawing Sheets

SYSTEM INTEGRATION IN AUTOMATION ENGINEERING

CROSS-REFERENCE TO RELATED APPLICATIONS

The instant application claims priority to European Patent Application No. 22183402.1, filed Jul. 6, 2022, which is incorporated herein in its entirety by reference.

FIELD OF THE DISCLOSURE

The present disclosure generally relates to systems and methods for integrating automation engineering subsystems into an aggregate system using at least one ontological model.

BACKGROUND OF THE INVENTION

The Modular Type Package (MTP) standard in the field of modular automation systems creates a framework for interoperability between modules and the orchestration system, allowing industrial process plants to be engineered in a modular way. These advantages are realized by prefabricated and well-tested modules, called PEAs (Process Equipment Assembly), that can readily be put together in different combinations so that different recipes can be realized. Various software tools are available which facilitate these tasks, from the process engineering phase, through the automation engineering phase, to the operations phase. These tools suffer from a lack of interoperability, which hinders their ability to assist engineers in carrying out process and automation engineering workflows.

BRIEF SUMMARY OF THE INVENTION

The present disclosure describes a method performed by an integration subsystem for integrating a plurality of automation engineering subsystems into an aggregate system, the method comprising using at least one ontological model to interface a first said automation engineering subsystem with a second said automation engineering subsystem.

The automation engineering subsystems may comprise hardware and/or software subsystems configured to assist a user in the process of designing and/or operating industrial process plants, particularly modular industrial process plants. The subsystems may comprise one or more subsystems for use in process and automation engineering (P&AE), i.e., P&AE subsystems. The subsystems may be configured to assist the user in performing one or more of: module selection; module configuration/parameterization; pipeline/topology design; orchestration design; module/pipeline optimization; pipeline/plant operation. In the non-limiting examples described hereinbelow, the automation engineering subsystems are described as (software) tools or applications. The plurality of automation engineering subsystems may comprise disparate or heterogenous subsystems which may reside on different operating systems, use different hardware, offer different functionality, use different storage or databases, use different computer languages, and/or use different date and time formats. In particular, each subsystem may use its own terminology or data model which is at least partly inconsistent with that of other subsystems, or at least partly unintelligible by other subsystems. The plurality of automation engineering subsystems per se may lack interoperability.

The plurality of automation engineering subsystems may form a portfolio (a suite or set) of subsystems for assisting the user in multiple aspects of the design, automation, and/or operation of the plant. In particular, the portfolio may be configured to assist the user during a particular workflow for use in process engineering, automation engineering, and/or control engineering in the context of industrial automation systems.

The workflow may be a P&AE workflow. The workflow may comprise steps relating to one or more of: module selection; module configuration/parameterization; plant topology design, particularly the arrangement of modules into pipelines; orchestration design; module/pipeline optimization; pipeline/plant operation. By "workflow" is meant a structured and repeatable pattern of activities, enabled by the systematic organization of resources into processes that transform materials, provide services, and/or process information. A P&AE workflow for example may comprise one or more of a process engineering phase, an automation engineering phase, and an operations phase. The method may thus comprise the further steps of carrying out one or more steps of such a workflow. There may also be provided a method of carrying out such a workflow comprising the method of the first aspect.

To integrate the plurality of automation engineering subsystems into the aggregate system, the method may thus comprise using the at least one ontological model to interface the first said automation engineering subsystem with the second said automation engineering subsystem.

Using the at least one ontological model to interface the subsystems may comprise translating output data obtained from the first said automation engineering subsystem to input data usable by the second said automation engineering subsystem. The output data obtained from the first said automation engineering subsystem may comprise terminology which is local to the first said automation engineering subsystem. The input data usable by the second said automation engineering subsystem may comprise terminology which is local to the second said automation engineering subsystem. (Two or more subsystems may use the same terminology. However, the presence of at least two subsystems which use a different terminology to each other makes the mapping/translation required since they could not interface/communicate with each other otherwise). Translating the output data to the input data may thus comprise translating the terminology which is local to the first said automation engineering subsystem to the terminology which is local to the second said automation engineering subsystem using the at least one ontological model. More particularly, the translating may comprise translating the terminology which is local to the first said automation engineering subsystem to terminology of a common ontology, and translating the terminology of the common ontology to the terminology which is local to the second said automation engineering subsystem. Translating the output data to the input data may comprise using one or more mapping or linkings, as described elsewhere herein.

The integration system is thus configured to integrate the automation engineering subsystems into the aggregate system. The integration may comprise system integration. That is, the integration may comprise bringing together the disparate component subsystems into the aggregate system, i.e., an aggregation of subsystems cooperating so that the aggregate system is able to deliver an overarching functionality. The integration may comprise facilitating the subsystems to interoperate so as to function together as a system, as a coordinated whole.

The integration may comprise performing horizontal and/or vertical integration of subsystems. To perform vertical integration, the integration subsystem may be configured to translate local terminology of the various subsystems to the terminology of the ontological model, as described elsewhere herein. This may comprise mapping local terminology of the subsystems to a common ontology. More particularly, by "vertical integration" is meant integration across one or more of the ontological models, the (object-oriented-programming) code of a particular tool, and the database for that tool (e.g., its relational or graph database).

To perform horizontal integration, the integration subsystem may be configured to serve as a specialized subsystem which is dedicated to facilitating communication between other subsystems using the ontological model. The other subsystems may thus interface with, i.e. communicate directly with, the integration subsystem. The integration subsystem may be configured to interface between subsystems by translating the interface to one subsystem into the interface to another subsystem. The integration subsystem may be configured to translate communications between subsystems. The integration system is configured to exchange data between subsystems or to link them together. The integration system may be configured to perform mediation between subsystems. The integration subsystem may be configured to act as a go-between or broker between subsystems. The integration subsystem may be configured to notify subsystems of events occurring in other subsystems. The integration subsystem may be configured to propagate changes to data made in one subsystem to other subsystems. The integration subsystem may be configured to act as a bus between subsystems. The integration subsystem may be configured to communicate with external systems on behalf of the other subsystems. The integration subsystem may be configured to front-end events arising from external systems and/or to expose data and interfaces of the underlying subsystems to external systems. The integration may comprise transforming data into a common data format. Any interfacing, translation, or communications functionality implemented by the integration subsystem may preserve the semantics of the original. New subsystems may be integrated into the aggregate system by interfacing them to the integration subsystem, for example by mapping them to the ontological model and creating a corresponding API.

The integration subsystem may alternatively be described as an integration layer, a facilitation layer, a facilitation and integration layer (FIL). Any such layers may be described as a semantic such layer. In the following examples, the integration subsystem is described as a semantic facilitation and integration layer or "SemFIL".

The ontological model may comprise a formal semantic representation of the terminologies used by the various automation engineering subsystems, as well as the relationships therebetween, and optionally also of the properties of the concepts/terms and the relationships therebetween. Each subsystem may employ its own terminology, vocabulary, or lexicon. This may be represented by way of a local ontology, a local data model, or a local tree, which is local to, or native to, that subsystem, or the domain(s) in which that subsystem is intended to operate (i.e., a domain ontology). The terms "local ontology" and "domain ontology" are in some cases used interchangeably. The ontological model, in contrast, represents a global, common, or upper ontology, which extends across multiple tools and/or domains. By "global" is thus meant that the ontology includes at least that content which is relevant for (and hence comprehensive/holistic with respect to) the workflow and process to be covered, not necessarily all conceivable content. The local/domain data model may be any kind of information model, provided its concepts are linkable to the upper ontology. Terms in the ontological model may represent concepts. As well as concepts or classes, the ontological model may comprise one or more properties, annotations, or individuals.

Concrete individuals may form part of an ontology-based knowledge graph. The ontological model may unambiguously specify the semantics of the terminologies of the subsystems. The common ontology may be shared among the heterogenous subsystems. In this way, interoperability can be achieved by translating terminology between subsystems using the common ontology as an interlingua. The ontological model may comprise a single ontology or may comprise multiple different subontologies. For example, the ontological model may comprise at least one process subontology comprising representations of one or more industrial processes, or general concepts to describe process plants. The process subontology may represent one or more of inputs, outputs, constraints, materials, and sequencing information, involved in the one or more industrial processes. The ontological model may comprise at least one domain ontology representing concepts relevant to a particular domain of interest (e.g., a P&AE domain), such as chemical engineering, or power engineering. The ontological model may comprise at least one subontology pertaining to requirements analysis or intentional modelling, to model the intentions of a plant owner (e.g., "I intend to separate oil and gas"). The ontological model may further comprise as subontologies one or more open-source ontologies such as OntoCAPE. The ontological model may define concepts and their interrelations in terms of a structured and/or hierarchically sorted vocabulary. The ontological model may define interrelations or dependencies between these terms/concepts in terms of one or more axioms. The ontological model may be manually and/or automatically extensible.

Real instance data can be linked to the concepts in the ontological model (i.e., the upper ontology) to create a knowledge graph. Additionally, or alternatively, real instance data can be linked to the local or domain ontologies.

The ontological model may be provided in a computer-interpretable format. The ontological model may be specified in a language for authoring ontologies, such as ontology web language (OWL), or any semantic serialization/formats (such as RDF).

One or more mappings may be obtained or defined which directly map the terminologies of the disparate subsystems to each other. One or more mappings may map the terminologies of the subsystems to the ontological model, which thereby indirectly maps the terminologies of the subsystems to each other. The mappings may comprise semantic-preserving mappings. Where a subsystem comprises software created using an object-oriented programming language, the mappings may comprise one or more object-relational mappings (ORMs). The mappings may comprise one or more extended object-relational mappings, that is, ORMs extended to include mappings to the ontological model. In particular, classes of objects within the software code may be mapped to concepts within the ontological model, properties of classes may be mapped to properties in the ontological model, and instances of objects may be mapped to individuals within the ontological model. In this way, the methods which are associated with the classes in OOP extend the functionality of the ontological model. For instance, a concept "module/PEA" in the ontology—in view of its being mapped to the corresponding class in OOP—has the OOP-class's methods, too, such that access to the methods (e.g., "module/PEA.execute( )") is enabled.

More concretely: the concept "module/PEA" can have an instance "reaction module" and the associated class may have a method "heat( )", which enables, via the API, access to the reaction module and execution of the heat( ) method, on whatever given instance data, across the boundaries of the ontological model, the OOP, and the relational database via vertical mapping and across the tools via the horizontal mapping. Additionally, metaclasses and annotations, as other abstract functionalities (such as the methods in OOP) are made available across horizontal and vertical boundaries via the mappings. Mappings may be manually defined, for example by a domain expert. Additionally, or alternatively, mappings may be automatically obtained or defined, for example using a rule-based algorithm. For example, mappings may be obtained by applying rules for retrieving or parsing semantic descriptions scattered within relevant data, for example the data model of OPC UA, classifying these semantic descriptions with common concepts, and subsuming the classified concepts to a formal data representation in a semantic ontology language.

Mappings may be stored and retrieved using a database. A database may be provided per subsystem. The database may comprise one or more of a relational database (or table) and a graph database.

The integration subsystem may comprise one or more translators for interfacing with each other subsystem. The translators may be configured to translate between the terminology of each subsystem (e.g., a local ontology) and the terminology of the ontological model (e.g. a common ontology). The translators may perform the translation as described elsewhere herein. The translators may be configured to use the mappings described elsewhere herein for performing the translation.

BRIEF DESCRIPTION OF THE SEVERAL VIEWS OF THE DRAWING(S)

A detailed description will now be given, by way of example only, with reference to the accompanying drawings.

DETAILED DESCRIPTION OF THE INVENTION

Figure 1:
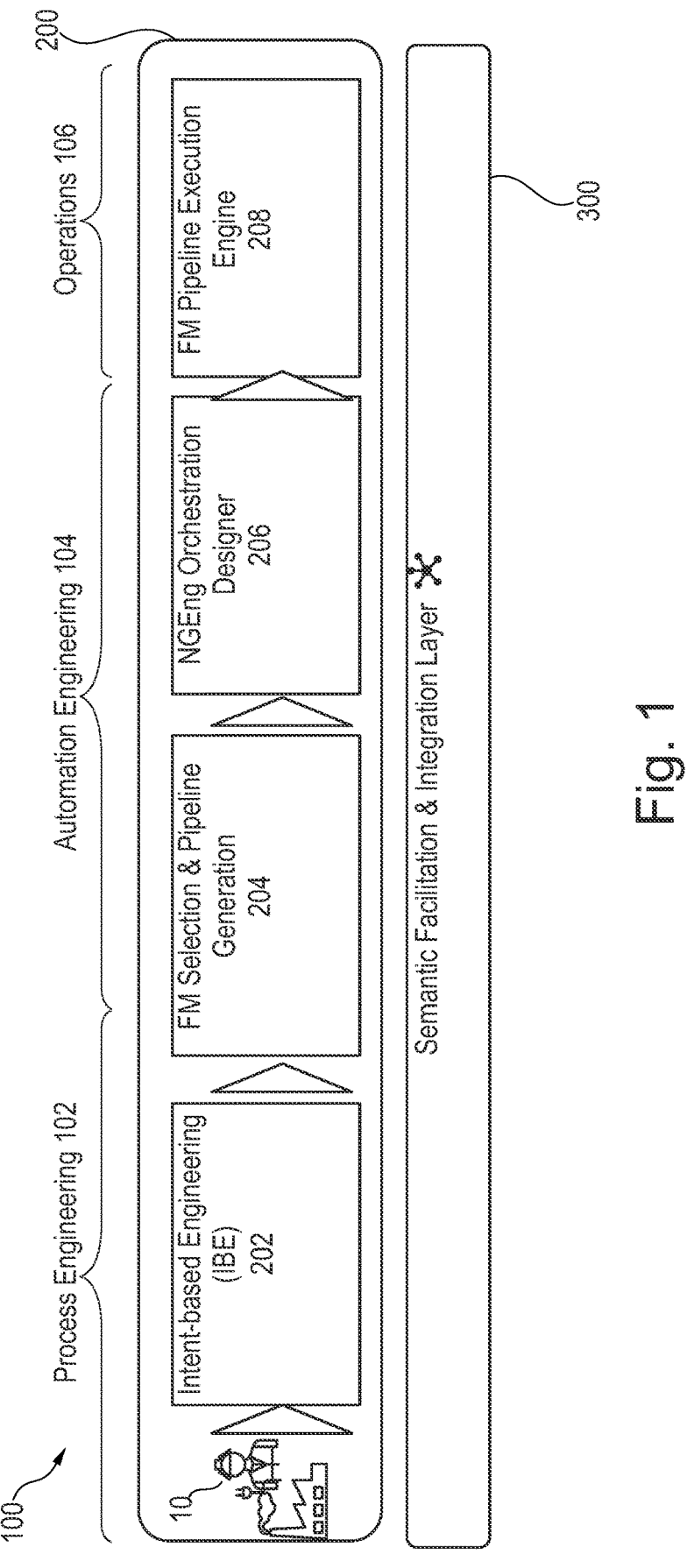
FIG. 1 illustrates a typical engineering workflow for designing and operating an industrial modular process plant, together with an application portfolio comprising tools used in the workflow in accordance with the disclosure.

FIG. 1 illustrates a typical process and automation engineering (P&AE) workflow 100 for designing and operating an industrial modular process plant, together with a P&AE application portfolio 200 comprising tools used in the workflow 100. The workflow 100 begins with a process engineering phase 102 in which the user 10 uses an intent-based engineering (IBE) tool 202 to perform intention modelling, intent formalization, and abstract service module representation. The user 10 may be engineer or plant operator. The IBE tool 202 outputs one or more specifications which serve as input to the next phase. In the automation engineering phase 104, the user 10 uses a module selection and pipeline generation tool 202 to generate one or more process pipelines for the plant. The same tool 202 may be used to perform optimization and/or parameter tuning. The module selection and pipeline generation tool 202 outputs one or more specifications describing the plant process topology to serve as input for the orchestration design. The user 10 then uses an orchestration design tool 206 to configure the orchestration layer of the plant. The orchestration design tool 206 allows the user to manipulate modules and plant topology, define alarms, and so on. Following this stage, an industrial plant is configured to carry out the designed process. In one example, in which the modules comprise function modules (FM), a pre-existing plant may be configured to carry out the process by using the orchestration design tool 206 to create instances of the function modules and to export the instances to the distributed control system (DCS) of the plant. Finally, in the operations phase 106, a pipeline execution tool 208 is used for automatic scheduling and execution of the process pipelines. It will be understood that the workflow 100 and portfolio 200 as depicted in FIG. 1 are provided for the purposes of illustration only and that other steps and other tools may be provided in place of, or as well as, the depicted steps and tools.

At least some of the tools 202-208 in the application portfolio 200 are separate from each other and have their own knowledge and information models as well as own language specifications. The tools cannot exchange information and data and cannot communicate and mutually affect each other. It would be beneficial for these tools to cooperate and further process each other's information and data in order for the full potential of optimization, advanced analytics and simulation to be exploited, leading towards more autonomous plants.

According to the present disclosure, there are provided ontology-based systems and methods to facilitate interoperability between tools in such a P&AE application portfolio. In the following disclosure, these are embodied by way of a semantic facilitation and integration layer (SemFIL) 300, which facilitates interaction between tools, exchange of knowledge and data, and communication between steps in the workflow, in order to integrate the various tools and their heterogeneous data.

Figure 2:
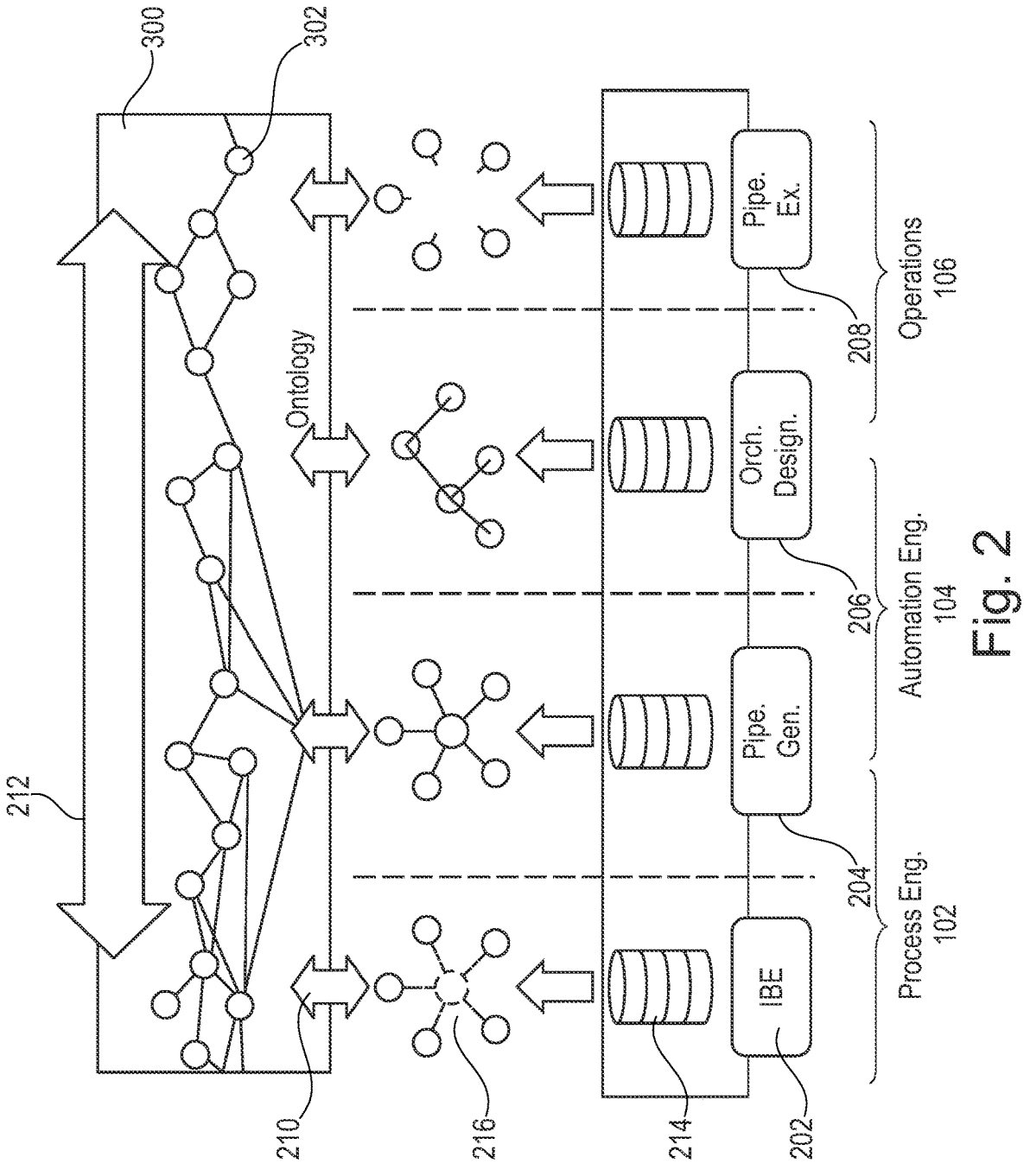
FIG. 2 illustrates the role of a semantic facilitation and integration layer according to the present disclosure in horizontally integrating the tools of the application portfolio via a common ontological model in accordance with the disclosure.

FIG. 2 illustrates the role of the SemFIL 300 in horizontally integrating the various tools in the application portfolio. The SemFIL 300 provides a common ontology 302 serving as an interlingua linking the various tools 202-208 to each other via the SemFIL 300. Vertical integration of each individual tool 202-208 into the SemFIL 300 is illustrated in FIG. 2 as a number of vertical links 210. The common language provided by the SemFIL 300 thus enables communication between the tools 202-208 via the SemFIL 300, thereby providing horizontal integration as illustrated in FIG. 2 by the horizontal link 212. The common underlying ontology 302 provided by the SemFIL 300 thus facilitates a loosely connected ontology-based portfolio of tools. Each tool may optionally have its own database 214, for example a relational database. Each tool may optionally have its own local data model or ontology 216, which may be represented in the database 214. The various data models 216 shown may be different to each other, complete or incomplete, compatible or incompatible. These data models 216 are brought together in the common ontology 302. The tools in the P&AE portfolio 200 (including future further applications) remain separately operable yet able to communicate with each other via the SemFIL 300 to exchange data consistently.

Figure 3:
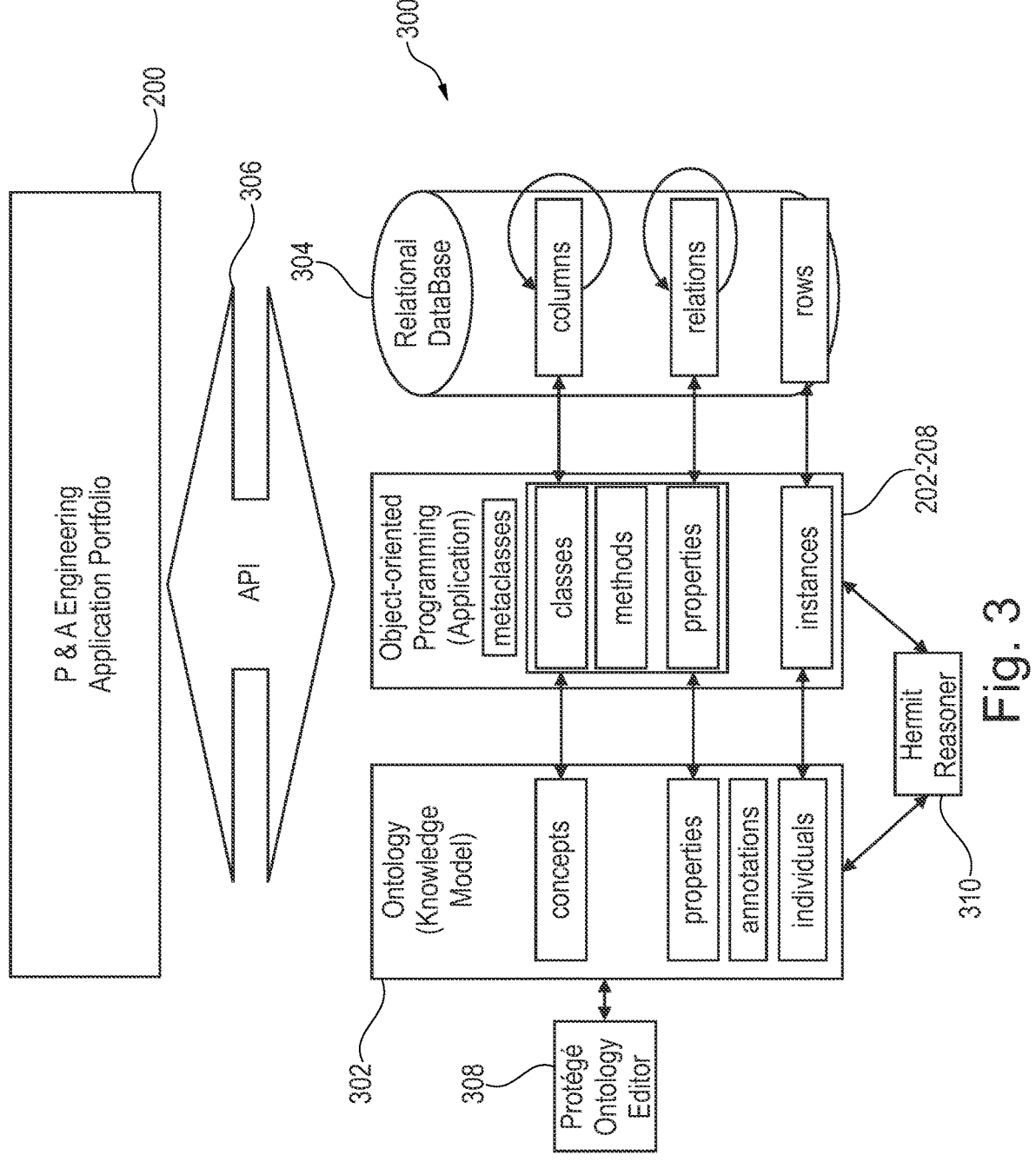
FIG. 3 illustrates the role of the semantic facilitation and integration layer in vertically integrating the common ontological model, the (object-oriented programming) code of a particular tool, and the database of that tool, in accordance with the disclosure.

FIG. 3 illustrates the role of the SemFIL 300 in vertically integrating the ontological model 302, the (object-oriented programming or OOP) code of a particular tool 202-208, and the database of that tool. In this way, the SemFIL 300 brings together different technologies or paradigms, namely ontological modelling, object-oriented programming, and relational databases. The SemFIL 300 in this example comprises the ontological model 302 along with a relational database 304. The relational database 304 may at least partially overlap with one or more of the tool databases 214. Components of the SemFIL 300 are exposed to the application portfolio 200 by an application programming interface (API) 306. An ontology editor 308 may be provided for creating and editing the ontological model 302. A semantic reasoner 310 may be provided for performing semantic reasoning.

The above-mentioned vertical integration of data and concepts is implemented in the non-limiting example shown via an extended object-relational mapping (ORM). That is, the ontological model 302, the object-oriented programming code of each tool 202-208, and the relational database or table 304 are connected to each other via a 1:1:1-mapping. By "extended" is meant that the object-relational mapping, which typically refers to the 1:1 mapping between data in databases and class-instances in OOP, is extended to include a further mapping to the ontological model to form a 1:1:1 mapping. Concepts in the ontological model 302 map directly to classes with methods in the code of the tool 202-208 and these in turn map directly to columns in the relational database 304. Similarly, properties in the ontological model 302 map to properties of classes in the code, which map to relations in the relational database 304, while individuals in the ontological model 302 map to instances (of OOP-classes) in the code and to rows in the database 304. There is therefore a mapping and linking of namespaces, concepts, specifiers, and relations using the SemFIL 300. Using such an extended object-relational mapping enables compliance with the best practice of decoupling (semantic) knowledge models from the application ecosystem, which is beneficial for enabling data management (storage, accessibility, findability, sharing, and usage) in information systems, such as digital twins, e.g., of modular industrial plants.

According to the present disclosure, there is therefore provided a combination of an ontology 302 (to facilitate the horizontal loose coupling of separate tools with possibly separate data models, as shown in FIG. 2) with an ontology-based extended object-relational 1:1:1 mapping. The combination of these two approaches (the combination of an ontology to act both horizontally and vertically to define the information model even for object-oriented program code and relational databases) enables a broad spectrum of semantic technologies (such as semantic reasoning, knowledge propagation, semantic query, data/knowledge discovery and accessibility, semantic inference, etc.) to be applied to the portfolio of tools 202-208 and to the entirety of the (heterogeneous) data available. Examples of semantic querying, reasoning, and matching include: "get all function modules with heating stirring functionality", or "if conti-process then no batch features available". The semantic querying may use e.g. SPARQL or other query languages which allow, e.g., filtering for instances of concepts that are linked to other concepts (e.g. for nested queries), or filtering for instances of concepts with certain properties or annotations (e.g. for identifying a subset of instances in a certain class: get all modules with heating functionality, which are currently not-under-maintenance—assuming that "not-under-maintenance" is a property that can be assigned to a module instance).

In one non-limiting example, concepts such as "intention", "requirement", "restriction", and "service" may be linked to the ontology, which may be used by an engineer to define intentions and services, and so on. Also the respective services' I/O and parameters are linked to the ontology (and optionally accordingly also its knowledge graph), so that the best module may be selected, or that module parameters or system alarms may automatically be set, which are linked to the restrictions, requirements, or KPIs, or to other elements of the ontology or knowledge graph.

Additionally, data may be stored (together with or separated from the mappings) in one or more relational databases (RDB) or simple tables (depending on the respective applications' way of handling data). Similarly, to a simple table, in an RDB, data can be stored in columns and rows, in two or possibly in more dimensions. The column specifications may relate to concepts, and the rows may represent the instances' data with respect to these concepts. In one non-limiting example, in which a part of such an RDB describes the specifications of a reaction module, the concepts describe "max capacity of tank", "min temperature", "max temperature", "max pressure", "I/O capacity", while the rows contain concrete instance data of such reaction modules: e.g., row 1, "my big reaction module" with "50 L" max capacity, with "−200° C./+500° C." min/max temp, and with "2000 bar" max pressure, and with "2 L per second" I/O capacity. Row 2 describes another reaction module "my mid-size reaction module" with "30 L" max capacity, with "−100° C./+300° C." min/max temp, and with "2000 bar" max pressure, and with "0.5 L per second" I/O capacity. Row 3 describes another reaction module "my small reaction module" with "10 L" max capacity, with "−100° C./+300° C." min/max temp, and with "1000 bar" max pressure, and with "0.1 L per second" I/O capacity. The column specs in this RDB map to the concepts in the ontological model, and the classes in the OOP, respectively. The rows (i.e., the instances' features) map to the instances in the ontology-related knowledge graph, and the instances in the OOP, respectively. Accordingly, the RDB can be accessed/manipulated/updated/extended/etc. using algorithms/methods in the context of OOP (e.g., via Python and SQLAlchemy), or via the ontological model (e.g., via Python and owlready2). For example, a new row may be entered into the RDB (thus creating a new instance of—in the above example—a reaction module), or the same may be achieved via code in OOP (i.e., programmatically) by creating a new instance of the respective OOP class, or via creating/adding an instance to the ontology-based knowledge graph.

Vertical integration is thus provided by the mappings defined between concepts in the ontological model 302 (where abstract concepts can have real instantiations and concrete data values), objects/classes in the object-oriented programming code (where instantiations of these classes contain the respective instance data), and columns in the relational database 304 (where the table's rows contain the respective data points and their respective values).

The API 306 allows access to the ontological model 302 and its relations, the application code and its methods, and the contents of the database 304. The API 306 may comprise functionalities for semantic querying, data retrieval, etc. The API is configured to interface not only between tools (or their respective code), but also from external entities to the ontological model, the OOP code, or the RDB of a given tool. For the API this means that the interface from a first tool to each of the ontological model, code, and relational database of a second tool may be implemented, enabling access/communication/exchange between the first tool and all of the said components of the second tool. In this sense, the API may be described as a generic (or parametrizable) API.

Referring again to FIG. 1, an algorithm performed by the SemFIL 300 for integrating the tools 202-208 comprises using the ontological model 302 to interface each tool with the next tool used in the workflow 100. In one non-limiting example, the algorithm comprises the following operations:

Use the IBE tool 202 to extract and formalize intention information from the plant owner's natural language intention. For example, the intention may be formulated as "process x-y-z initial educts into a-b-c product, while minimizing energy costs, and maximizing parallelism".

The SemFIL 300 maps the intention to the ontological model 302, thus obtaining a formalized semantic description of the intended process plant setup, e.g., overall I/O, functionalities, KPIs, etc.

The SemFIL 300 maps the formalized semantic description to the local (pipeline-generator) ontology of the module selection and pipeline generation tool 204 and triggers that tool 204 to generate (i.e., design) a pipeline of modules for stepwise transformation of the initial educts into the final product.

The SemFIL 300 maps the generated module pipeline to the ontological model and from there to the local ontology of the orchestration designer tool 206, in which form the generated module pipeline is imported into the orchestration designer tool 206.

Use the orchestration designer tool 206 to perform e.g. module engineering and/or topology engineering to generate (i.e. design the plant topology). Further steps may depend on the plant design.

Numerous use cases of the systems and methods described herein are envisaged by the present disclosure. In these use cases, data is related to the ontological model (via the ontology-based vertical 1:1:1 ORM mappings) and accessible across the entire portfolio 200 of tools (via the ontology-based horizontal loose couplings). In the use cases, the ontology transparently defines concepts and their interrelations and properties, knowledge which can be automatically applied to the respectively linked data. At least the following use cases are envisaged:—

Bottleneck detection in a process plant pipeline;

KPI optimization (e.g., energy cost) in a process plant pipeline;

Context-aware workflow-wizard, i.e., a GUI tool allowing the user to provide ontology-based, data-driven support for other P&AE tools. For example, when adapting the HMI using the orchestration designer 206, the wizard may recognize from the ontology that a concept named "alarm", which is linked to the "HMI" concept, should be added or edited next, and may therefore prompt the user to attend to it;

Formal verification against the ontology. In one non-limiting example, the method comprises preventing the user from entering incorrect data (e.g., upper/lower control limits), incorrect information/material flow (max capacities, thresholds, bottlenecks, etc.), based on the concepts and relations defined in the ontology;

Explainable timeseries data analysis for industrial process plant digital twins (e.g., triggering alarms according to concepts and relations in the ontology). Here, the ontology and the relational database with its mappings may use annotations that tag, e.g., a timeseries database (TSDB) with storage for timeseries data. In one non-limiting example, in which the process is linked to its properties, critical thresholds or restrictions, etc. via the ontology, an alarm may be triggered when measured timeseries data go too high/low (without having to explicitly program this in the tool). The alarm may even have an accompanying explanatory feature which tells the user that this alarm was fired, since timeseries values x, y, z are too high with respect to the allowed values in the ontology (and/or its underlying graph representation);

Ontology-controlled, data-driven diagnostic data analytics for process plant monitoring and maintenance planning;

Ontology-controlled simulation-data-based process plant parameter calibration (e.g., for interaction with physical assets), so that the user may have a digital twin including a simulation of the engineering process, whereby the simulation and real physical asset are compared via their links to the ontology, thus allowing for deviation management or for recalibration, etc.

The systems and methods described herein provide for a streamlined and automated (towards autonomous) workflow (intention towards topology and control). Hence, no paper, no file exchange is required. Instead, processing takes place automatically via the ontology: user does not need to know about it. Heterogeneous information/data is not a problem. Information from P&AE need not be discarded after engineering, but instead retained throughout the entire plant life cycle, with the ontology being extended accordingly. The tools as described herein may present the user with proposals (e.g., through the relations in the graph). For example, once the user has defined the HMI, the tool may hint at accordingly needed/suitable alarms. When adapting the HMI in the orchestration designer, the tool may suggest, based on the link in the ontology between the "alarm" concept and the "HMI"-concept, that alarms should be added/edited next. KG-based P&AE Workflow Context-awareness!

Similarly, when, e.g., in ChemRef, via a link between a chemical process and its properties, critical thresholds, or restrictions, an alarm may be triggered when measured timeseries data becomes too high/low (without having to explicitly program this into the tool). The alarm may have an explanatory feature which tells the user that the alarm was triggered because timeseries values x, y, z are too high/low with respect the allowed value set defined in the suggested parameters of the respective chemical process (in the ontology and its underlying graph representation).

Generally, the systems and methods described herein may provide the user with hints when certain patterns are being deviated from, again with an explanatory graph-based feature.

The systems and methods described herein may provide for ontology-controlled simulation-data-based process plant parameter calibration (e.g., for interaction with physical assets), so that the user may have a Digital Twin including a simulation of the engineering process, and the simulation and real physical assets are being compared via their links to the ontology, allowing for deviation management or for re-calibration. Based on relations/correlations defined in the ontology, the systems and methods may prevent the user from entering incorrect information (upper/lower control limits), incorrect information flow or material flow (max capacities, thresholds, bottlenecks, etc.). In other words, the systems and methods may enable formal verification against the ontology.

Lastly, by having semantic reasoning enabled, the systems and methods may provide for continuous self-sync reasoning with respect to consistency, as soon as new information/data is entered. For example, in the case that a new reactor is intended, a need for a PID controller may be identified, or, in the case that a new level transmitter is added, it may be determined that this cannot be connected to one or more other components.

Numerous variations to the systems and methods described herein may be envisaged. For example, a graph database may be used in place of the relational database.

Figure 4:
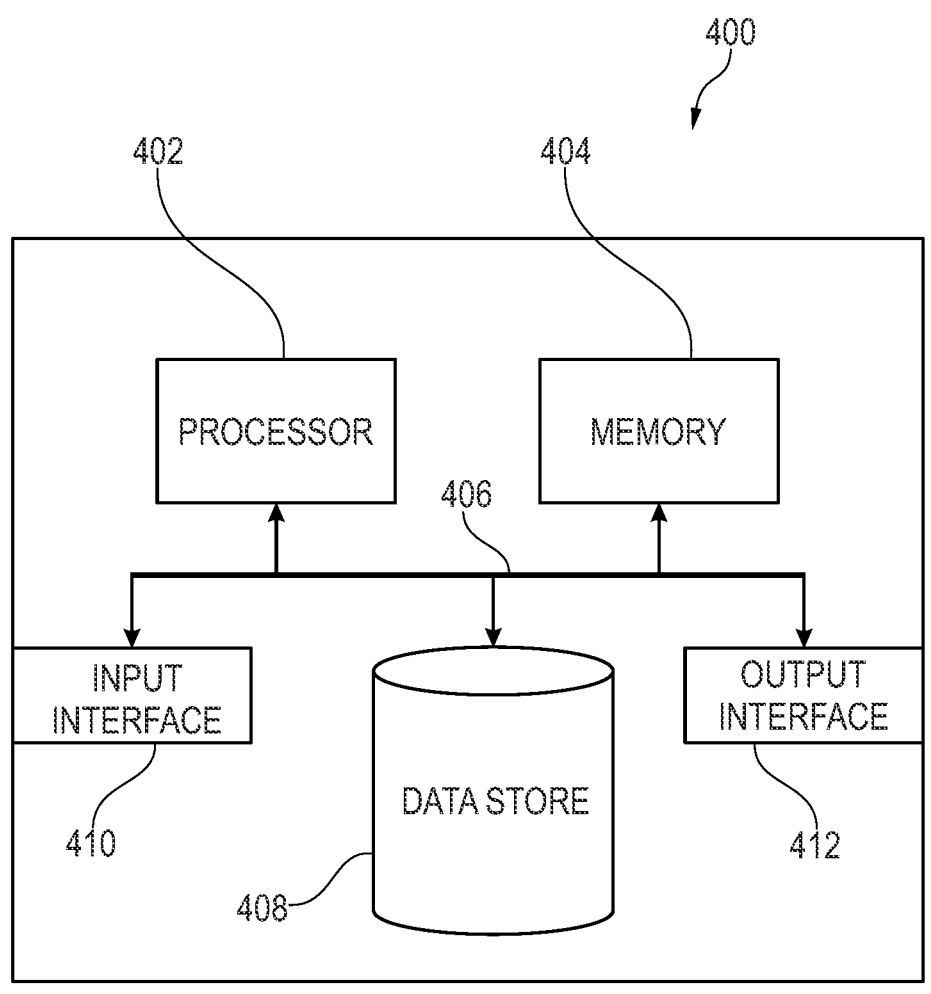
FIG. 4 illustrates a computing system that can be used in accordance with the systems and methods disclosed herein.

FIG. 4 illustrates an exemplary computing system 400 that can be used in accordance with the systems and methods disclosed herein. The computing system 400 may form part of or comprise any desktop, laptop, server, or cloud-based computing system. The computing system 400 includes at least one processor 402 that executes instructions that are stored in a memory 404. The instructions may be, for instance, instructions for implementing functionality described as being carried out by one or more components described herein or instructions for implementing one or more of the methods described herein. The processor 402 may access the memory 404 by way of a system bus 406. In addition to storing executable instructions, the memory 404 may also store conversational inputs, scores assigned to the conversational inputs, etc.

The computing system 400 additionally includes a data store 408 that is accessible by the processor 402 by way of the system bus 406. The data store 408 may include executable instructions, log data, etc. The computing system 400 also includes an input interface 410 that allows external devices to communicate with the computing system 400. For instance, the input interface 410 may be used to receive instructions from an external computer device, from a user, etc. The computing system 400 also includes an output interface 412 that interfaces the computing system 400 with one or more external devices. For example, the computing system 400 may display text, images, etc. by way of the output interface 412.

It is contemplated that the external devices that communicate with the computing system 400 via the input interface 410 and the output interface 412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing system 400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing system 400 may be a distributed system. Thus, for instance, several devices may be in communication by way of a network connection and may collectively perform tasks described as being performed by the computing system 400.

Various functions described herein can be implemented in hardware, software, or any combination thereof. If implemented in software, the functions can be stored on or transmitted over as one or more instructions or code on a computer-readable medium. Computer-readable media include computer-readable storage media. Computer-readable storage media can be any available storage media that can be accessed by a computer. By way of example, and not limitation, such computer-readable storage media can comprise FLASH storage media, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal may be included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

It has to be noted that embodiments of the invention are described with reference to different categories. In particular, some examples are described with reference to methods whereas others are described with reference to apparatus. However, a person skilled in the art will gather from the description that, unless otherwise notified, in addition to any combination of features belonging to one category, also any combination between features relating to different category is considered to be disclosed by this application. However, all features can be combined to provide synergetic effects that are more than the simple summation of the features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The mere fact that certain measures are recited in mutually different dependent claims does not indicate that a combination of these measures cannot be used advantageously.

Any reference signs in the claims should not be construed as limiting the scope.

The method may comprise utilizing one or more semantic technologies in conjunction with the ontological model. The method may comprise using the ontological model to perform one or more of validation, querying, simulation, and analytics using semantic technologies. The method may comprise using the ontological model to perform one or more semantic technologies including encoding/decoding of semantic representations; creation of knowledge graphs; autorecognition of concepts; information and meaning extraction; semantic data integration; and taxonomies/classification. Further semantic technologies are described hereinbelow.

The method may further comprise using a semantic reasoner (alternatively describable as a reasoning engine, rules engine, or a reasoner) to determine the consistency and/or completeness of the ontological model (i.e., its concepts and/or relationships) and/or of data associated therewith (for example of data in a related knowledge graph). For example, the method may comprise using the semantic reasoner to classify or re-parent data. The method may comprise using a semantic reasoner to infer logical consequences from the ontological model, e.g., from its concepts and axioms. Inference rules may be specified for this purpose, for example by means of an ontology language and/or a description logic language. The semantic reasoner may be configured to use first-order predicate logic to perform reasoning, for example to perform inference by forward chaining and backward chaining. The semantic reasoner may be configured to determine whether the ontology is consistent, to identify subsumption relations between concepts, and so on. Consistency checks may be performed periodically, continuously, or in response to the entry of new information/data. For example, the entry of a new reactor may indicate the need for a PID controller.

The method may comprise creating a (semantic) digital twin of the modular industrial process plant or any of its components. For example, a process plant digital twin may be created by formally describing the process plant intention, for example by semantically describing e.g. one or more of: what inputs/outputs are processed, in which order, by which modules, what constraints apply or need to be considered, what rules govern it, how alarms are triggered, etc., and then describing how the intended setup (process plant topology and functionality) can be automated (again with the above features such as alarms, restrictions, I/O, etc.) and controlled or scheduled. In contrast to the manual use of the existing tools to set up the components of the digital twin, the methods and systems described herein facilitate and integrate the overall workflow, allowing the components to be put together to form a (more) holistic Digital Twin. The process plant digital twin may also be accessible via the API described elsewhere herein. The digital twin allows the process engineering, the automation engineering, and/or the operation of the respective process plant and of its components and of its related data to be described, edited, modelled, simulated, analyzed, and/or investigated.

The integration subsystem may interface with the other subsystems via any appropriate means, for example one or more application programming interfaces (APIs).

The method may further comprise performing one or more of the following actions using at least one of the subsystems, the aggregate system, or another system: module selection; module configuration/parameterization; pipeline/topology design; orchestration design; module/pipeline optimization; pipeline/plant operation; bottleneck detection in a pipeline; KPI optimization in a pipeline; workflow assistance; prompting the user to handle related concepts during workflow assistance; timeseries data analysis; timeseries data analysis for industrial process plant digital twins; data analytics; data analytics for process plant monitoring and maintenance planning; ontology-controlled, data-driven diagnostic data analytics for process plant monitoring and maintenance planning; simulation of modules, pipelines, or the plant; parameter calibration; ontology-controlled simulation-data-based process plant parameter calibration; formal verification against ontology.

The method of the first aspect may be computer implemented.

According to a second aspect, there is provided a computing system configured to perform the method of the first aspect. The computing system may implement the integration subsystem, the aggregate system and/or any one or more of its other subsystems as described herein.

According to a third aspect, there is provided a computer program (product) comprising instructions which, when executed by a computing system, enable or cause the computing system to perform the method of the first aspect.

According to a fourth aspect, there is provided a computer-readable medium comprising instructions which, when executed by a computing system, enable or cause the computing system to perform the method of the first aspect. The computer-readable medium may be transitory or non-transitory, volatile or non-volatile.

According to the present disclosure, there are therefore provided systems and methods (e.g., tools and workflows) for the facilitation of semantic digital twins of modular industrial process plants.

Numerous other benefits are associated with the subject-matter described herein, particularly in terms of time and cost savings. Using the systems and methods described herein, each application and its respective data and knowledge model can stay separated, e.g., loosely coupled yet interlinked, thus following IIoT best practice of decoupling knowledge and applications. The applications and portfolios may remain compliant with all relevant external standards (e.g., VDI 2658, etc.) or languages/vocabularies (SysML, etc.). No internal changes to the applications need be made: the systems and methods described herein are 'non-invasive'. There is no need to retrofit the existing applications or portfolios and, hence, only minimal translational efforts are involved in terms of the mapping, which is iteratively further extensible. Semantic technologies (e.g., querying, reasoning, etc.) and vertical integration of data are facilitated, particularly in existing application portfolios that are not developed in a fully ontological model-based way ab initio. Data-driven analytics applications are simplified in many use case scenarios. The inherently transparent ontology enhances the explainability of, and therefore the credibility of, data-driven advanced analytics. In the P&AE domain, the potential for full automation is at least partly realized by the systems and methods described herein, in the sense of allowing for systems capable of operating in the real-world environment without any form of external control for extended periods of time. Through having vertically mapped technologies and horizontally mapped subsystems, steps of the workflow can be automated, such as intention formulation and extraction, pipeline generation, optimization with respect to chosen criteria, execution, testing, and so on. The subject-matter described herein, particularly, the horizontal and vertical integration by means of an ontology, promotes FAIR data principles (findability, accessibility, interoperability, and reusability of data and tools).

The terms "system" or "subsystem" as used herein may refer to hardware, firmware, and/or software configured to perform any of the operations described herein. Software may be embodied as a software package, code, instructions, instruction sets and/or data recorded on at least one transitory or non-transitory computer readable storage medium. Firmware may be embodied as code, instructions or instruction sets and/or data hard-coded in memory devices (e.g., non-volatile memory devices). The terms "(sub)system", "tool", and "engine", may be used interchangeably.

A "modular industrial process plant" may comprise at least an "orchestration layer" and a "module layer". The orchestration layer may comprise a "supervisory control system", which may be provided by a "distributed control system". The module layer comprises a plurality of "modules" each described by a configuration file, for example a Module Type Package or MTP. Modules in the context of the MTP standard may be described as Process Equipment Assemblies or PEAs. Each module may comprise a controller executing control logic (automation logic) for the module. Each module may provide one or more encapsulated process functions, called services, such as mixing, tempering or heating, that can be orchestrated by the supervisory control system. The modules are integrated into the plant via the orchestration layer. By controlling the services in the right way, the orchestration layer ensures that the modules work together to fulfil the requirements of the plant. Communications between entities in the orchestration layer and module layer may take place via an architecture network using for example the OPC UA protocol (OPC Unified Architecture).

By "function module" is meant a software module providing a control configuration for a hardware module of a modular automation system.

The term "obtaining", as used herein, may comprise, for example, receiving from another system, device, or process; receiving via an interaction with a user; loading or retrieving from storage or memory; measuring or capturing using sensors or other data acquisition devices.

The term "determining", as used herein, encompasses a wide variety of actions, and may comprise, for example, calculating, computing, processing, deriving, investigating, looking up (e.g., looking up in a table, a database or another data structure), ascertaining, and the like. Also, "determining" may comprise receiving (e.g., receiving information), accessing (e.g., accessing data in a memory), and the like. Also, "determining" may comprise resolving, selecting, choosing, establishing and the like.

The indefinite article "a" or "an" does not exclude a plurality. In addition, the articles "a" and "an" as used herein should generally be construed to mean "one or more" unless specified otherwise or clear from the context to be directed to a singular form.

Unless specified otherwise, or clear from the context, the phrases "one or more of A, B and C", "at least one of A, B, and C", and "A, B and/or C" as used herein are intended to mean all possible permutations of one or more of the listed items. That is, the phrase "A and/or B" means (A), (B), or (A and B), while the phrase "A, B, and/or C" means (A), (B), (C), (A and B), (A and C), (B and C), or (A, B, and C).

The term "comprising" does not exclude other elements or steps. Furthermore, the terms "comprising", "including", "having" and the like may be used interchangeably herein.

The invention may include one or more aspects, examples or features in isolation or combination whether specifically disclosed in that combination or in isolation. Any optional feature or sub-aspect of one of the above aspects applies as appropriate to any of the other aspects.

These and other aspects of the invention will be apparent from and elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method performed by an integration subsystem for integrating a plurality of automation engineering subsystems, the plurality of automation engineering subsystems including a first automation engineering subsystem and a second automation engineering subsystem that collectively form an aggregate system, the method comprising:

achieving a vertical integration and a horizontal integration of the first automation engineering subsystem and the second automation engineering subsystem using at least one ontological model, the at least one ontological model comprising a formal semantic representation of terminologies used by each of the plurality of automation engineering subsystems, wherein each of the plurality of automated engineering subsystems uses a different terminology;

wherein the horizontal integration uses the at least one ontological model to translate output data obtained from the first said automation engineering subsystem to input data usable by the second automation engineering subsystem;

wherein each of the subsystems comprises software code created using an object-oriented programming language and each further includes a relational database, and wherein the vertical integration is achieved by a mapping that connects the at least one ontological model, the programming code, and the relational database.

2. The method of claim 1, wherein the output data obtained from the first automation engineering subsystem comprises terminology which is local to the first automation engineering subsystem, wherein the input data usable by the second automation engineering subsystem comprises terminology which is local to the second automation engineering subsystem, and wherein translating the output data to the input data comprises translating the terminology which is local to the first automation engineering subsystem to the terminology which is local to the second automation engineering subsystem using the at least one ontological model.

3. The method of claim 2, wherein the translating comprises translating the terminology which is local to the first automation engineering subsystem to terminology of a common ontology that extends across the first automation engineering subsystem and the second automation engineering subsystem, and translating the terminology of the common ontology to the terminology which is local to the second said automation engineering subsystem.

4. The method of claim 1, wherein the ontological model comprises a formal semantic representation of terminologies used by each of the plurality of automation engineering subsystems.

5. The method of claim 1, wherein the mapping maps classes of objects within the software code to concepts within the ontological model, wherein the concepts relate to properties of an industrial process or machine.

6. The method of claim 1, wherein the mapping maps properties of classes within the software code to properties in the ontological model.

7. The method of claim 1, wherein the mapping maps instances of objects in the software code to elements within the ontological model.

8. The method of claim 1, wherein the mapping is stored using at least one relational database, using at least one graph database, or using both.

9. The method of claim 1, further comprising using the ontological model to perform one or more of performing data validation, answering queries, performing simulations, and obtaining analytics using semantic technologies.

10. The method of claim 1, wherein the first automation engineering subsystem extracts intention information from a natural language intention received from a user and the second automation engineering subsystem selects a module that executes a function of an industrial plant, and generates a modular pipeline of modules.

11. The method of claim 10, wherein a third automation engineering subsystem imports the generated module pipeline of modules and designs a plant topology.

12. The method of claim 1, wherein a combination of the vertical integration and the horizontal integration is effective to allow disparate semantic technologies to be applied to the plurality of automation engineering subsystems.

13. The method of claim 12, wherein the disparate semantic technologies comprise one or more of semantic reasoning technologies, knowledge propagation technologies, semantic query technologies, data/knowledge discovery and accessibility technologies, and semantic inference technologies.

* * * * *